United States Patent
Sonnenberg et al.

(10) Patent No.: US 10,527,479 B2
(45) Date of Patent: Jan. 7, 2020

(54) DIP STICK HOUSING AND CLOSURE ASSEMBLY

(71) Applicant: RB Distribution, Inc., Colmar, PA (US)

(72) Inventors: Trevor Sonnenberg, Hatfield, PA (US); Jerry Hall, Colmar, PA (US); Emily Lafferty, Colmar, PA (US)

(73) Assignee: RB Distribution, Inc., Colmar, PA (US)

( * ) Notice: Subject to any disclaimer, the term of this patent is extended or adjusted under 35 U.S.C. 154(b) by 181 days.

(21) Appl. No.: 15/934,422

(22) Filed: Mar. 23, 2018

(65) Prior Publication Data

US 2019/0293469 A1 Sep. 26, 2019

(51) Int. Cl.
*G01F 23/04* (2006.01)
*F01M 11/04* (2006.01)

(52) U.S. Cl.
CPC ...... *G01F 23/04* (2013.01); *F01M 2011/0491* (2013.01)

(58) Field of Classification Search
CPC .............................. G01F 23/04; G01F 23/045
USPC .................................................. 33/722–731
See application file for complete search history.

(56) References Cited

U.S. PATENT DOCUMENTS

| | | | |
|---|---|---|---|
| 1,307,734 A | 6/1919 | Gullborg | |
| 2,314,430 A | 2/1941 | Smith | |
| 3,349,944 A * | 10/1967 | Moeller | G01F 23/04 184/109 |
| 3,371,418 A | 3/1968 | Moeller | |
| 3,474,884 A * | 10/1969 | Braun | F16N 19/003 184/109 |
| 3,662,470 A | 5/1972 | Sasgen | |
| 3,738,176 A * | 6/1973 | Kerfoot | G01F 23/04 73/864.64 |
| 3,885,317 A | 5/1975 | Karts | |
| 4,067,113 A * | 1/1978 | Haines | G01F 23/04 33/727 |
| 4,245,367 A | 1/1981 | Stoute | |
| 4,531,293 A | 7/1985 | Grinde | |
| 4,761,886 A | 8/1988 | Wilson et al. | |
| 4,941,268 A | 7/1990 | Tausk | |
| 5,485,681 A | 1/1996 | Hitchock | |
| 5,613,303 A | 3/1997 | Kayano et al. | |
| 5,829,153 A * | 11/1998 | Hitchock | G01F 23/04 33/728 |
| 6,029,509 A * | 2/2000 | Singarella | G01F 23/045 15/220.4 |
| 6,314,808 B1 | 11/2001 | Williams et al. | |
| 6,453,740 B1 | 9/2002 | Williams et al. | |
| 6,988,403 B2 | 1/2006 | Dougherty et al. | |
| 7,055,384 B2 | 6/2006 | Williams et al. | |
| 7,131,213 B2 | 11/2006 | Dougherty et al. | |
| 7,134,220 B2 | 11/2006 | Porter et al. | |
| 7,584,547 B2 | 9/2009 | Keith et al. | |

(Continued)

*Primary Examiner* — George B Bennett
(74) *Attorney, Agent, or Firm* — Volpe and Koenig, P.C.

(57) ABSTRACT

A fluid wand closure assembly includes a receiving tube with a wand receiving aperture and a predetermined external surface configuration. A wand holder fits within and abuts the receiving tube. A ring is configured to complement the external surface configuration and to abut the wand holder. Tightening the ring against the wand holder causes the ring to abut the wand holder and causes the wand holder to abut the receiving tube and seal the closure.

12 Claims, 5 Drawing Sheets

(56) References Cited

U.S. PATENT DOCUMENTS

| | | | |
|---|---|---|---|
| D696,619 S | 12/2013 | Ryan et al. | |
| 9,696,196 B2 | 7/2017 | Nachefski | |
| 2009/0049706 A1* | 2/2009 | Hart | G01F 23/04 |
| | | | 33/731 |
| 2011/0247230 A1* | 10/2011 | Goldstein | G01F 23/04 |
| | | | 33/725 |
| 2016/0069726 A1* | 3/2016 | Pettigrew | G01F 23/30 |
| | | | 33/722 |
| 2016/0187178 A1* | 6/2016 | Itoo | F01M 11/12 |
| | | | 33/726 |

* cited by examiner

DIP STICK HOUSING AND CLOSURE ASSEMBLY

FIELD OF INVENTION

This invention relates generally to dip sticks employed to measure the fluid in a reservoir that is not easily visible. More particularly, the invention relates to measuring fluids associated with motors and transmissions. Most particularly, the invention relates to motors and transmissions associate with heavy equipment, such as over the road trucks.

BACKGROUND

It is important to have an accurate reading of the fluids, such as lubricating oil, transmission shifting fluid, and coolant, associated with various pieces of equipment. It is also important to be sure that any access opening to the fluid reservoir is sealed to avoid the passage of external contaminants into the reservoir. In addition, it is important to have a closure that is easily operated and durable.

Prior art attempts at addressing all three requirement, such as those shown in U.S. Pat. Nos. 3,662,470; 6,453,740; and 6,314,808 have not met all three requirement successfully.

SUMMARY

The present solution provides a fluid measuring wand closure assembly with a wand receiving tube that has an external surface with a helical configuration. The wand is in a holder that fits within the receiving tube and abuts the receiving tube. An independent closing ring has interior surface with a helical configuration that complements the helical configuration the wand receiving tube. The mating of the helical surface forms the assembly without required any movement of the dip stick in the housing.

BRIEF DESCRIPTION OF THE DRAWING(S)

DETAILED DESCRIPTION OF THE PREFERRED EMBODIMENT

Figure 1:
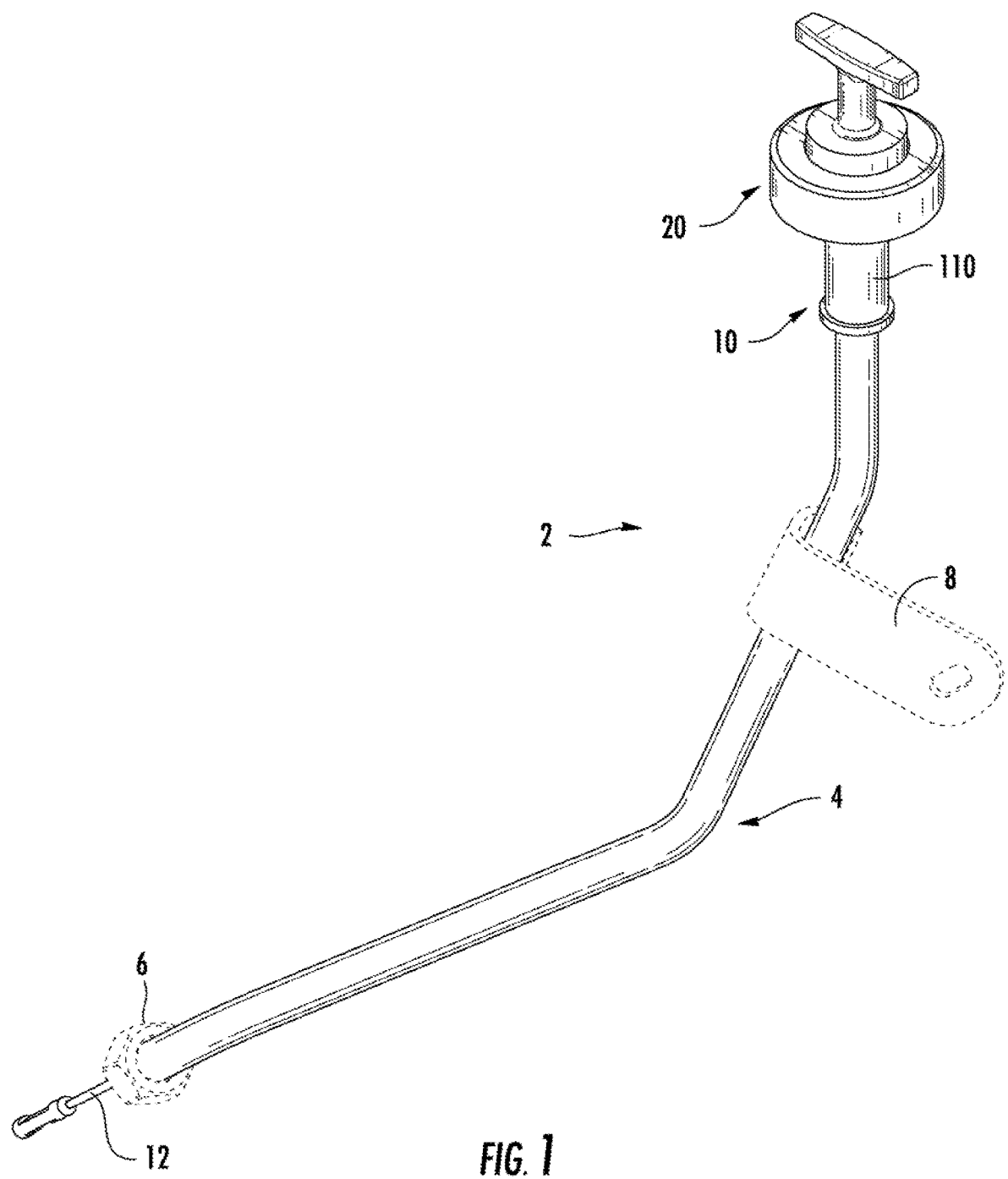
FIG. 1 illustrates the dip stick housing and closure assembly as it might appear when attached to a fluid reservoir.

With reference to FIG. 1, there is illustrated a dip stick housing and closure assembly 2. As illustrated, the housing 2 has a dip stick receiving tube 4. The illustrated receiving tube 4 has one known configuration; however, it will be known to those skilled in the art that the tube is configured according to condition of use which will determine its dimensions and shape. Also, as illustrated in FIG. 1, the end of tube 4 that is to be associated with a fluid reservoir typically has some devise, such as nut 6 (illustrated in phantom), for connecting to the reservoir. In use, the device for connecting the tube 4 will be determined by the application. The tube 4 also typically has some form of stabilization, such as clip 8 (illustrated in phantom) that hold the tube 4 against movement.

Figure 2:
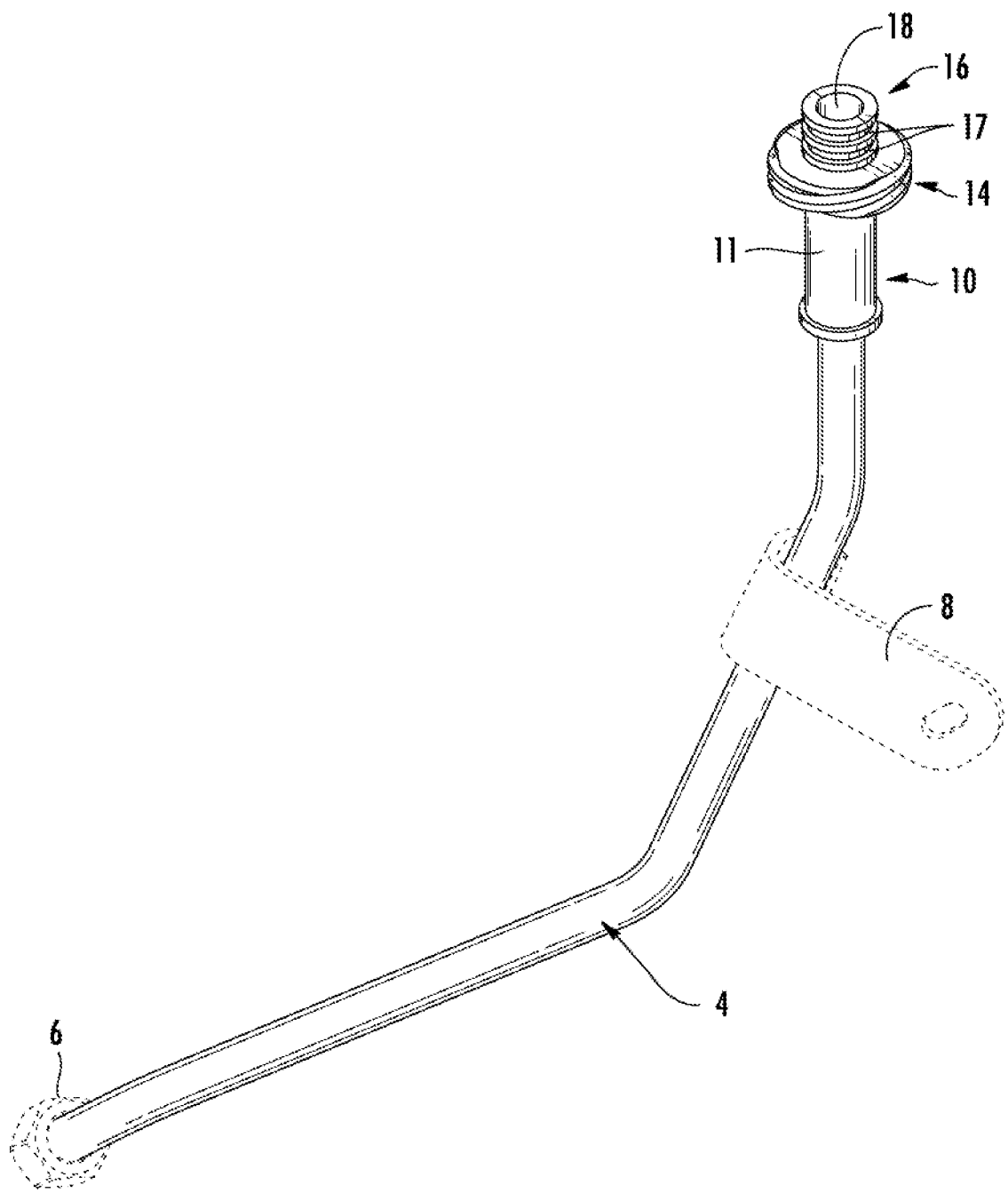
FIG. 2 illustrates the dip stick housing without the closure.
Figure 3:
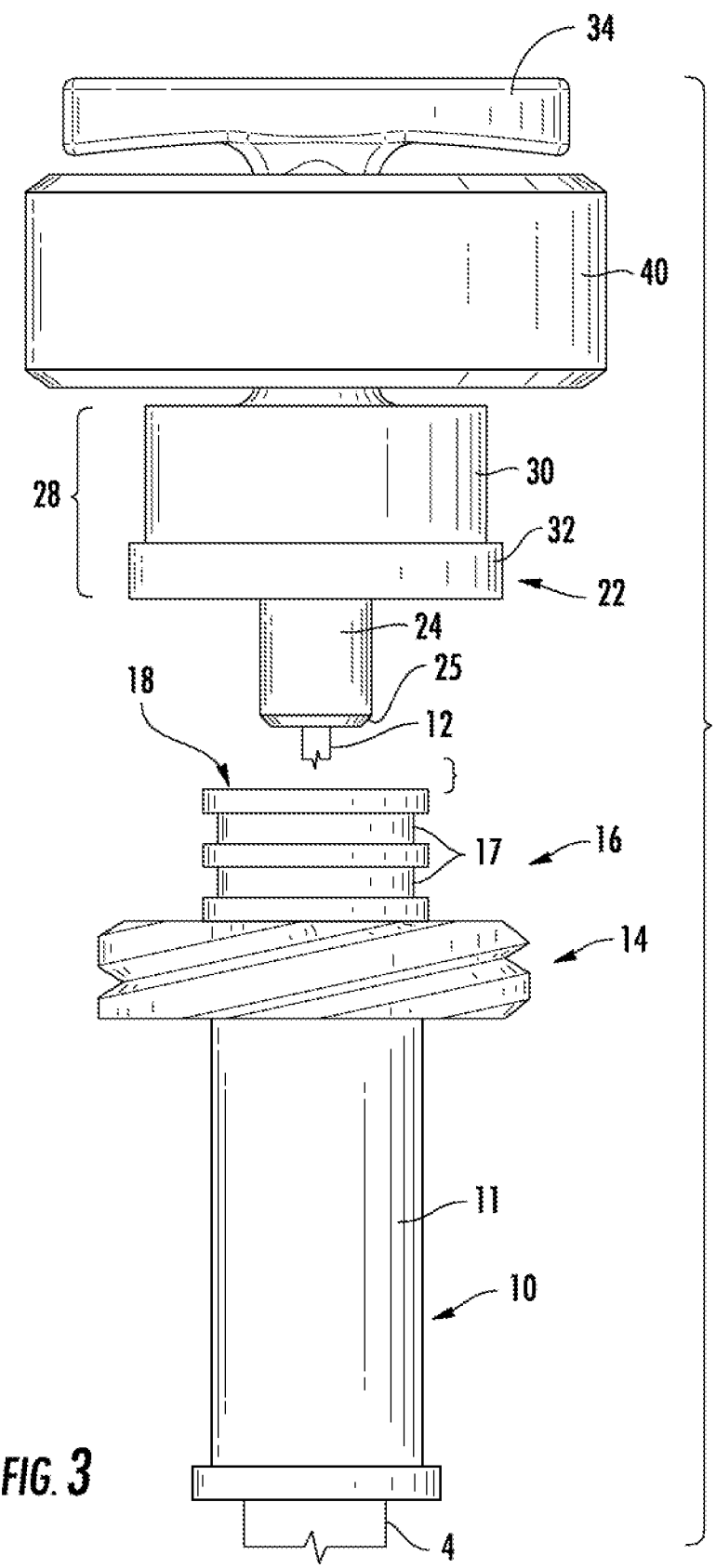
FIG. 3 illustrates the closure prior to assembly on the dip stick housing.

As shown in FIG. 2, the closure 20 at the free end 10 of the dip stick housing 4 has a cap 11 that is a molded assembly that forms one half of the closure assembly 20 and includes a projection 16 that defines a dip stick receiving aperture 18 and a collar 14 that is configured to be one half of an interlocking assembly. As shown in FIGS. 2 and 3, the projection 16 includes recesses 17 that are dimensioned to receive sealing gaskets 19, such as the "o" rings shown in FIGS. 4 and 5. Still with reference to FIG. 3, the closure assembly 20 has a dip stick or wand holder 22 with a central post 24 that actually holds the dip stick or wand 12. The central post 24 has a beveled edge 25 that complements the beveled edge 26 on the inside of the cap where if abuts the tube 4.

Figure 4:
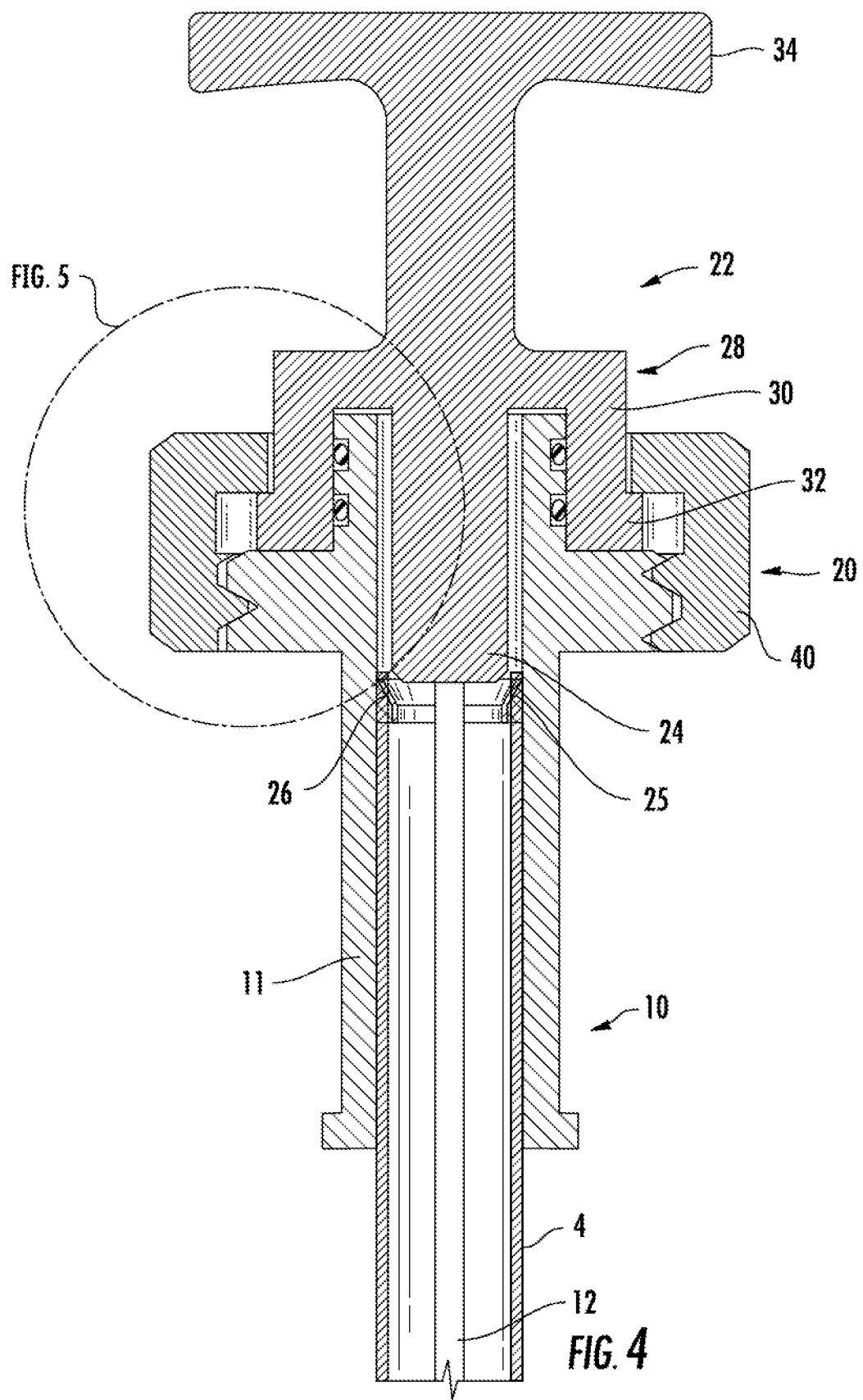
FIG. 4 is a sectional view that illustrates the closure and dip stick housing in the assembled condition; and, FIG. 5 is an exploded view of the encircled area of FIG. 4.
Figure 5:
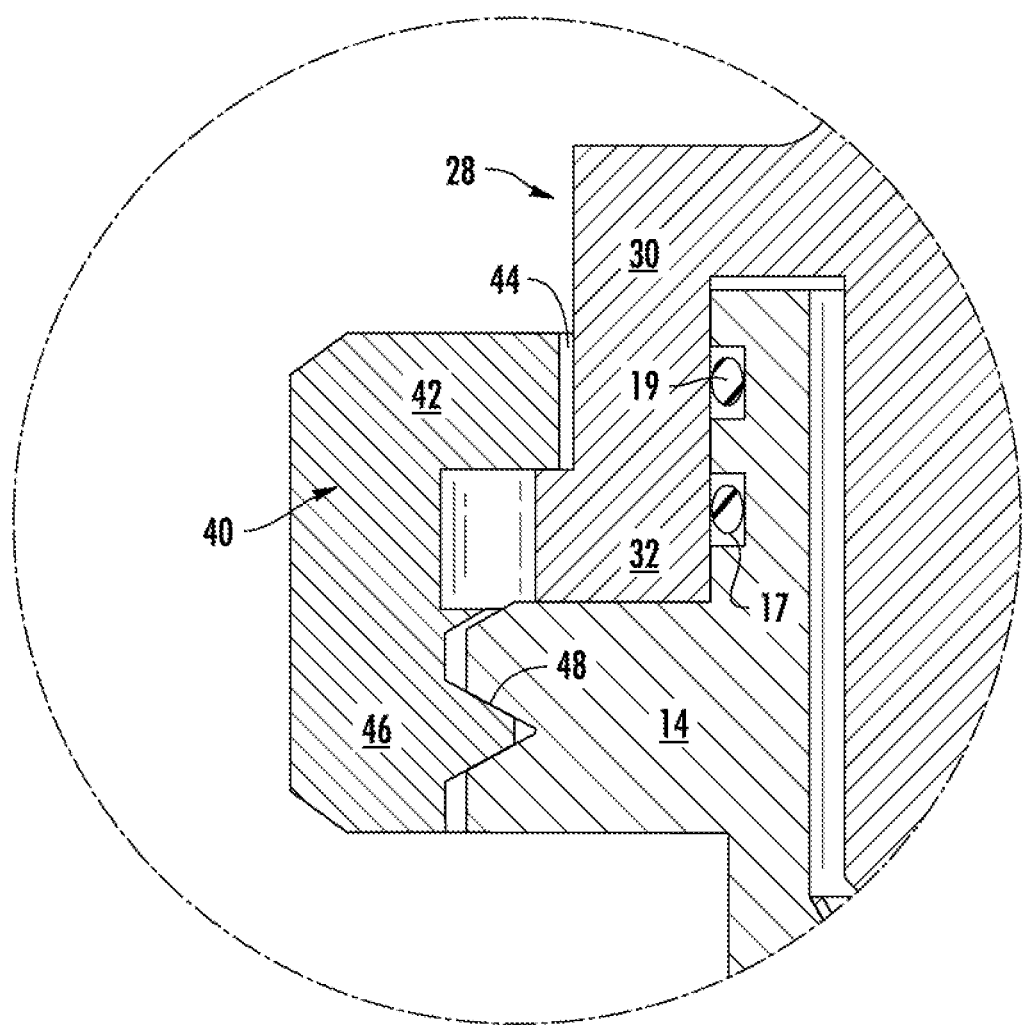

With reference to FIGS. 3, 4, and 5, the dip stick holder 22 has a collar 28 with an interior cavity that receives the projection 16. The outer dimension of the interior cavity is selected so that is complements the outer dimension of projection 16 and establishes a seal. The exterior of collar 28 has a first portion 30 and a section portion 32 in the form of a step that surrounds the first portion 30. The ring portion 40 of the closure 20 is a separate and independent structure with an upper projection 42 that defines a aperture 44 which is greater than the outer dimension of the upper portion of the collar 28 but less than the outer dimension of the step 32. Accordingly, ring 40 will pass over the upper portion of color 28 but not the step 32. The ring 40 has an interior portion 46 that has projections 48 configured to complement collar 14 and form the other half of an interlocking assembly. Tightening the ring 40 on the housing 4 brings the assembly into a secured and sealed condition.

As a result of constructing the closure assembly 20 with the wand holder and ring as independent structures, the parts are independently rotatable with respect to each other. Thus, the ring 40 can be applied and removed without requiring rotation of the dip stick or wand holder 22 against the gasket 19. Likewise, the wand or dip stick 12 can be inserted and withdrawn in a generally linear motion which also avoids rotational wear on the sealing gaskets 19. In addition, enclosing the fastener elements 14 and 46 within the ring 40 limits their exposure to degradation and/or damage due to fluid and/or debris that might attack the exposed outer portions.

What is claimed is:

1. A fluid measuring wand closure assembly comprising:
   a wand receiving tube having a first end that connects to a fluid reservoir and a second end that receives a wand and the second end has an external surface with a predetermined outer dimension and configuration;
   a wand holder that has a first portion that fits within the second end of the wand receiving tube and an abutment portion configured to abut the wand receiving tube; and,
   a ring that has a first interior surface that abuts the wand holder and an inner surface that is recessed from the first interior surface and has a configuration that complements the external surface with a predetermined outer dimension and configuration;
   whereby engagement of the external surface of the wand receiving tube and the inner surface of the ring causes the ring to abut the wand receiving tube.

2. The closure assembly of claim 1, wherein the second end of the wand receiving tube terminates in a projection having at least one sealing position; and,
   the wand holder has a recess that is dimensioned to surround the projection of the wand receiving tube and engage with the at least one sealing position.

3. The closure assembly of claim 1, wherein the wand receiving tube has projection with an outer dimension that is less than the predetermined outer dimension of the external surface and includes at least one sealing position; and,
   the wand holder is configured to engage with the at least one sealing position.

4. The closure assembly of claim 3, wherein the second end of the wand receiving tube terminates in a projection having at least one sealing position; and,
   the wand holder has a recess that is dimensioned to surround the projection of the wand receiving tube and engage with the at least one sealing position.

5. The closure assembly of claim 1 wherein the external surface of the wand receiving tube has a helical configuration.

6. The closure assembly of claim 1 wherein the wand holder and ring are independently rotatable.

7. A fluid measuring wand closure assembly comprising:
   a wand receiving tube having at least one end with an external surface that has a helical configuration;
   a wand holder that has a first portion that fits within the wand receiving tube and an abutment portion that abuts the wand receiving tube; and,
   a ring with an interior surface that has a helical configuration that complements the helical configuration of the wand receiving tube and a portion that abuts the wand holder;
   whereby engagement of the respective helical configurations of the wand receiving tube and the ring cause the wand holder to abut the wand receiving tube.

8. The closure assembly of claim 7 wherein the wand holder and ring are independently rotatable.

9. A fluid measuring wand closure assembly comprising:
   a wand receiving tube having an external surface with a predetermined configuration at one end of the wand receiving tube;
   a wand holder having a portion that fits within the wand receiving tube and a portion that abuts the wand receiving tube, the portion that abuts the wand receiving tube has at least one gasket; and,
   a ring having a first internal portion with a predetermined configuration that complements the predetermined configuration of the wand receiving tube and a second internal portion that is configured to abut the wand holder;
   whereby engagement of the respective predetermined configurations causes the ring to abut the wand holder and causes the wand holder to abut the wand receiving tube.

10. A fluid measuring wand housing assembly comprising:
    a tubular housing having a fluid reservoir connection end and a wand receiving end that has an externally contoured outer surface with a predetermined outer dimension and configuration;
    a wand holder that has a first portion that fits within the wand receiving end of the housing and a second portion configured to abut the wand receiving end; and,
    a ring with an interior surface that is dimensioned to engage the second portion of the wand holder and an internally contoured inner surface that complements the externally contoured outer surface of the wand receiving end;
    whereby a tightening engagement of the contoured surfaces of the wand receiving end and the ring causes the wand holder to abut the wand receiving end of the wand receiving tube.

11. The fluid measuring wand housing assembly of claim 10 wherein the wand holder and ring are independently rotatable.

12. The fluid measuring wand housing assembly of claim 11, wherein the wand receiving end terminates in a projection having at least one sealing position; and,
    the wand holder has a recess that is dimensioned to surround the projection of the wand receiving end and engage with the at least one sealing position.

* * * * *